(12) United States Patent
Kwon et al.

(10) Patent No.: US 12,413,324 B2
(45) Date of Patent: Sep. 9, 2025

(54) NETWORK MANAGEMENT SYSTEM AND METHOD FOR SYNCHRONIZATION OF COMMUNICATION NETWORK

(71) Applicant: SOLiD, INC., Seongnam-si (KR)

(72) Inventors: Donghee Kwon, Yongin-si (KR); Hoopyo Hong, Gwacheon-si (KR)

(73) Assignee: SOLiD, INC., Seongnam-si (KR)

( * ) Notice: Subject to any disclaimer, the term of this patent is extended or adjusted under 35 U.S.C. 154(b) by 381 days.

(21) Appl. No.: 17/780,844

(22) PCT Filed: Dec. 3, 2019

(86) PCT No.: PCT/KR2019/016952
§ 371 (c)(1),
(2) Date: May 16, 2023

(87) PCT Pub. No.: WO2021/107241
PCT Pub. Date: Jun. 3, 2021

(65) Prior Publication Data
US 2023/0275740 A1    Aug. 31, 2023

(30) Foreign Application Priority Data
Nov. 29, 2019  (KR) .......................... 10-2019-0157660

(51) Int. Cl.
*H04L 7/04*      (2006.01)
*H04J 3/06*      (2006.01)
(Continued)

(52) U.S. Cl.
CPC .......... *H04J 3/0641* (2013.01); *H04J 3/0667* (2013.01); *H04L 7/04* (2013.01); *H04L 41/00* (2013.01); *H04L 47/70* (2013.01)

(58) Field of Classification Search
CPC ............. H04L 5/14; H04L 7/04; H04J 3/0667
See application file for complete search history.

(56) References Cited

U.S. PATENT DOCUMENTS 8,644,351 B2 *  2/2014  Hamasaki ............. H04J 3/0688
                                                    370/252
9,106,352 B2 *  8/2015  Zheng ................... H04J 3/0658
(Continued)

FOREIGN PATENT DOCUMENTS

CN    106358283 A    1/2017
JP    2007101183 A   4/2007
(Continued)

OTHER PUBLICATIONS

Office Action issued Jul. 4, 2023 in Japanese Application No. 2022-532004.
(Continued)

*Primary Examiner* — Bailor C Hsu
(74) *Attorney, Agent, or Firm* — Sughrue Mion, PLLC

(57) ABSTRACT

Provided are a method of synchronizing a communication network, the method comprising obtaining a quality parameter of at least two or more synchronization sources connected to communication nodes in a communication network and a capacity parameter of the communication nodes connected to the synchronization sources, selecting a synchronization source to be used for synchronization of the communication network from among the at least two or more synchronization sources, according to a priority based on the obtained quality parameter and capacity parameter and performing synchronization of the communication network using a synchronization signal provided from the selected synchronization source.

15 Claims, 7 Drawing Sheets

(51) Int. Cl.
    *H04L 41/00*     (2022.01)
    *H04L 47/70*     (2022.01)

(56) References Cited

U.S. PATENT DOCUMENTS

| | | | |
|---|---|---|---|
| 9,973,601 B2* | 5/2018 | Spada | H04J 3/0641 |
| 10,484,163 B2* | 11/2019 | Tanwar | H04J 3/0667 |
| 11,323,194 B2* | 5/2022 | Wen | H04J 3/0641 |
| 11,375,464 B2* | 6/2022 | Gulati | H04W 56/0025 |
| 11,641,632 B2* | 5/2023 | Zhao | H04B 17/318 370/350 |
| 11,997,621 B2* | 5/2024 | Kwak | H04W 56/00 |
| 2011/0200051 A1 | 8/2011 | Rivaud et al. | |
| 2012/0069943 A1 | 3/2012 | Lim et al. | |
| 2014/0078957 A1 | 3/2014 | Shin et al. | |
| 2015/0113174 A1 | 4/2015 | Yang et al. | |
| 2017/0055235 A1* | 2/2017 | Rabii | H04N 21/4325 |
| 2019/0140757 A1 | 5/2019 | Ruffini et al. | |
| 2021/0006344 A1* | 1/2021 | Chen | G01S 19/14 |
| 2021/0400635 A1* | 12/2021 | Blasco Serrano | H04W 52/52 |
| 2023/0083152 A1* | 3/2023 | Fu | H04W 56/0015 370/350 |
| 2023/0421977 A1* | 12/2023 | Araujo-Simon | G06F 30/20 |

FOREIGN PATENT DOCUMENTS

| | | |
|---|---|---|
| JP | 2016-51995 A | 4/2016 |
| WO | 2019/0168461 A1 | 9/2019 |

OTHER PUBLICATIONS

Extended European Search Report dated Dec. 4, 2023, issued in European Application No. 19954640.9.
Communication dated Jan. 9, 2024, issued in Japanese Application No. 2022-532004.
International Search Report for PCT/KR2019/016952 dated Aug. 24, 2020 [PCT/ISA/210].
Written Opinion for PCT/KR2019/016952 dated Aug. 24, 2020 [PCT/ISA/237].
Communication issued Dec. 6, 2024 in Korean Application No. 10-2019-0157660.

* cited by examiner

FIG. 4

| DAC Unit Name | DAS Unit IP Address | Priority | Designated 1588GM Role | SyncSource Role | Max 1588 Slave Capacity | Oscillator Qlaity | Current 1588 Slave Counts | Unit State Qlaity | Current 1588 Mode |
|---|---|---|---|---|---|---|---|---|---|
| RU001 | 192.168.9.100 | 100 | Enabled | Enabled | 8 | 24 | 7 | Active | GM |
| HU002 | 10.0.0.1 | 50 | Enabled | Enabled | 16 | 65 | 0 | Active | Slave |
| DAU001 | 30.0.0.1 | 20 | Enabled | Enabled | 64 | 98 | 0 | Active | Slave |
| RU010 | 20.0.0.01 | 10 | Enabled | Enabled | 8 | 24 | 0 | Inactive | N/A |
| . . . | | | | | | | | | |

FIG. 5

| DAC Unit Name | DAS Unit IP Address | 1588 Support | SyncE Support | 1588 BC Capability | 1588 Connection Tracking Enable | Max 1588 Slave Capacity | Current 1588 Mode | Current 1588 Connection Tracking Counts | Current 1588 Slave Counts | Unit State | SyncState Interface | SyncMaster Interface |
|---|---|---|---|---|---|---|---|---|---|---|---|---|
| RU001 | 192.168.9.101 | Yes | Yes | Yes | No | 8 | BC | N/A | 4 | Active | IF1 | IF2, IF3, IF4 |
| RU002 | 10.0.0.10 | Yes | Yes | No | No | N/A | TC | N/A | N/A | Active | IF2 | IF2, IF3, IF4 |
| DAU020 | 30.0.0.10 | Yes | Yes | Yes | Yes | 64 | TC | 7 | N/A | Active | IF2 | IF2, IF3, IF4, IF5, IF6 |
| RU030 | 20.0.0.10 | Yes | No | No | No | N/A | N/A | N/A | N/A | Inactive | N/A | N/A |
| ... | | | | | | | | | | | | |

NETWORK MANAGEMENT SYSTEM AND METHOD FOR SYNCHRONIZATION OF COMMUNICATION NETWORK

TECHNICAL FIELD

The present invention relates to a method of synchronizing a network management system and a communication network, and more particularly, to a network management system capable of selecting a synchronization source to be used for synchronization of a communication network according to a priority based on a quality parameter of synchronization sources and a capacity parameter of the communication nodes connected to the synchronization sources, and a method of synchronizing a communication network.

BACKGROUND ART

A distributed antenna system (DAS), which is currently commercially available, receives external reference clock information from a headend device and transmits reference clocks to other nodes (e.g., an extension device or a remote device, etc.).

However, headend devices are generally arranged in a separate space inside a building where most of distributed antenna systems are installed for reasons such as large size and weight, and requiring separate power supply. In such a structure, in order to receive external reference clock information, there is a structural inefficiency in that a clock source and a headend device that are far apart from each other need to be connected to each other with a cable.

DESCRIPTION OF EMBODIMENTS

Technical Problem

The technical problem to be achieved by the present invention is to provide a network management system capable of selecting a synchronization source to be used for synchronization of a communication network according to a priority based on a quality parameter of synchronization sources and a capacity parameter of communication nodes connected to the synchronization sources, and a method of synchronizing a communication network.

Solution to Problem

According to an aspect of an embodiment, a method of synchronizing a communication network, the method comprising obtaining a quality parameter of at least two or more synchronization sources connected to communication nodes in a communication network and a capacity parameter of the communication nodes connected to the synchronization sources, selecting a synchronization source to be used for synchronization of the communication network from among the at least two or more synchronization sources, according to a priority based on the obtained quality parameter and capacity parameter and performing synchronization of the communication network using a synchronization signal provided from the selected synchronization source.

According to an aspect of an embodiment, the quality parameter and the capacity parameter may be stored in the form of a table in a network management system that manages the communication network.

According to an aspect of an embodiment, the priority may be flexibly determined based on the quality parameter and the capacity parameter.

According to an aspect of an embodiment, the quality parameter is determined based on at least one of a holdover time of a synchronization source, temperature stability, an operating temperature range, a stratum level, a frequency quality, and a phase quality.

According to an aspect of an embodiment, the capacity parameter may be determined based on the number of slave nodes that can be accommodated when a communication node to which a synchronization source is connected operates as a master node.

According to an aspect of an embodiment, the method may further comprise receiving the capacity parameter from each of the communication nodes in the communication network.

According to an aspect of an embodiment, the priority may be determined by reflecting a weight in each of the quality parameter and the capacity parameter.

According to an aspect of an embodiment, the method further comprise after selecting a synchronization source to be used for synchronization of the communication network, determining a synchronization mode of each of the communication nodes based on a selected synchronization source and characteristic information of each of the communication nodes in the communication network.

According to an aspect of an embodiment, the characteristic information of each of the communication nodes may comprise at least one of whether each of the communication nodes supports a specific synchronization mode, whether a communication node connected to a corresponding communication node may be tracked, the capacity of a slave node, the number of communication nodes currently connected to a corresponding communication node, and the number of slave nodes corresponding to a communication node.

According to an aspect of an embodiment, the number of communication nodes currently connected to the corresponding communication node may be obtained using a connection tracking function of an IEEE 1588 PTP protocol.

According to an aspect of an embodiment, the synchronization mode may be a transparent clock mode or a boundary clock mode of an IEEE 1588 PTP protocol.

According to an aspect of an embodiment, the communication network may comprise at least one of a headend device, an extension device, and a remote device, and at least one of the synchronization sources is connected to the extension device or the remote device.

According to an aspect of an embodiment, the method may further comprise monitoring whether the selected synchronization source has a failure and selecting another synchronization source to be used for synchronization of the communication network according to a priority recalculated based on the quality parameter and the capacity parameter when the selected synchronization source has a failure.

According to an aspect of an embodiment, the method may further comprise when the failure of the selected synchronization source is resolved, determining whether to use the selected synchronization source that was selected before the failure to synchronize the communication network.

According to an aspect of an embodiment, a network management system may comprise a memory configured to obtain and store a quality parameter of at least two or more synchronization sources connected to communication nodes in a communication network and a capacity parameter of the communication nodes connected to the synchronization sources, a processor configured to select a synchronization source to be used for synchronization of the communication network from among the at least two or more synchronization sources, according to a priority based on the quality parameter and the capacity parameter, and a communication interface configured to transmit a setting signal for performing synchronization of a communication network to the communication network by using a synchronization signal provided from the selected synchronization source.

Advantageous Effects of Disclosure

A method and a device according to an embodiment of the present invention may provide an optimal synchronization signal according to the state of synchronization sources and the state of a communication network by selecting a synchronization source to be used for synchronization of a communication network according to a priority based on a quality parameter of synchronization sources and a capacity parameter of communication nodes connected to the synchronization sources.

BRIEF DESCRIPTION OF DRAWINGS

A brief description of each drawing is provided to more fully understand drawings recited in the detailed description of the present invention.

FIG. 4 is a table showing parameters respectively corresponding to communication nodes connected to a synchronization source, according to an embodiment.

FIG. 5 is a table showing characteristic information of each of communication nodes according to an embodiment.

MODE OF DISCLOSURE

Figure 1:
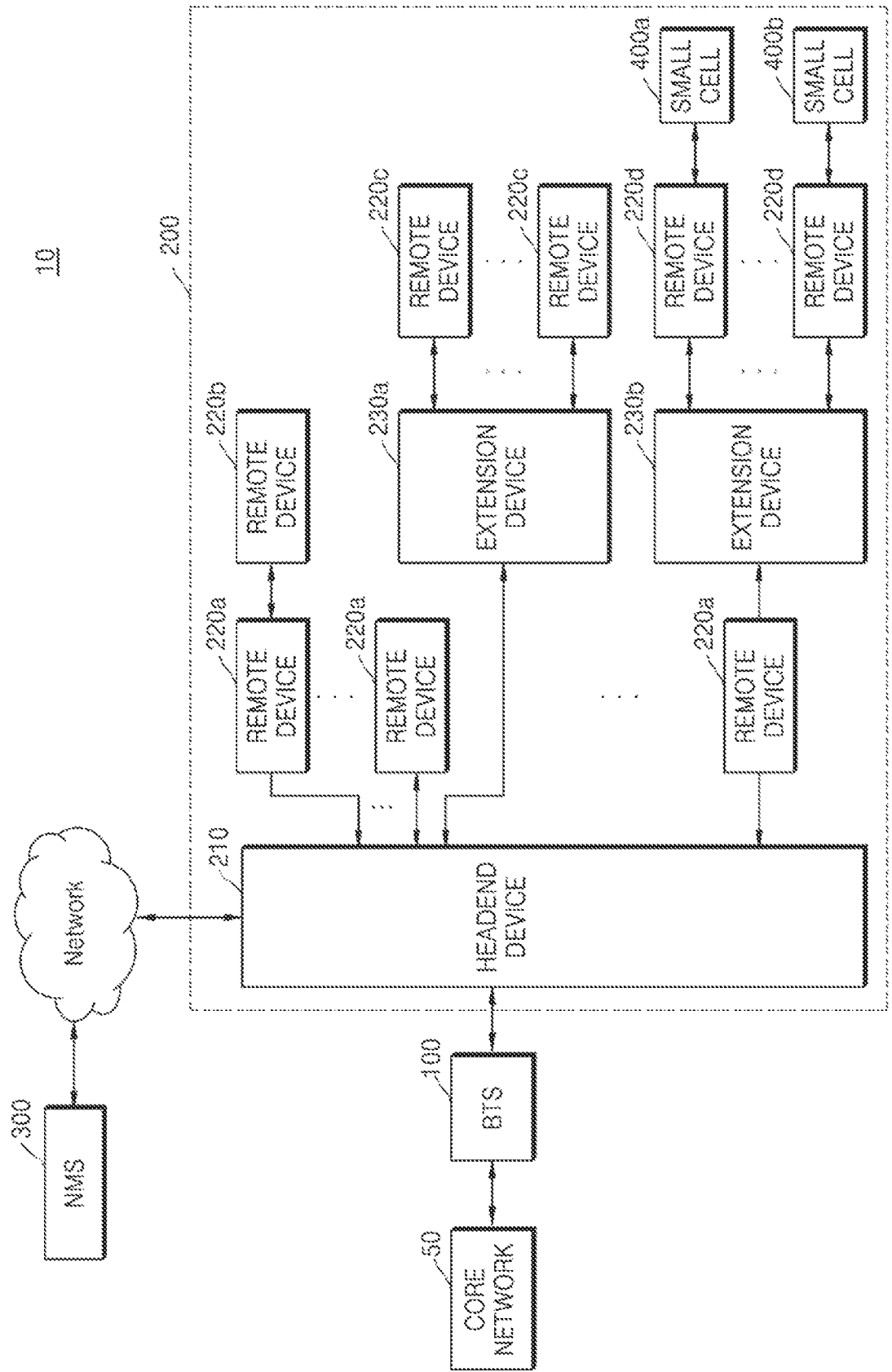
FIG. 1 is a conceptual diagram of a communication system according to an embodiment of the present invention.

Since the disclosure may have diverse modified embodiments, preferred embodiments are illustrated in the drawings and are described in the detailed description. However, this is not intended to limit the disclosure to particular modes of practice, and it is to be appreciated that all changes, equivalents, and substitutes that do not depart from the spirit and technical scope of the disclosure are encompassed in the disclosure.

In the description of the disclosure, certain detailed explanations of the related art are omitted when it is deemed that they may unnecessarily obscure the essence of the disclosure. In addition, numeral figures (e.g., first, second, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

In addition, it is intended to clarify that the division of the components in the specification is only made for each main function that each component is responsible for. That is, two or more components to be described later below may be combined into one component, or one components may be divided into two or more components according to more subdivided functions. In addition, it goes without saying that each of the components to be described later below may additionally perform some or all of the functions of other components in addition to its own main function, and some of the main functions that each of the components is responsible for may be dedicated and performed by other components.

FIG. 1 is a conceptual diagram of a communication system according to an embodiment of the present invention.

Referring to FIG. 1, the communication system 10 may include a core network 50, a base transceiver station (BTS) 100, a distributed antenna system (DAS) 200 for relaying communication signals of the BTS 100, and a network management system (NMS) 300 for managing and monitoring the DAS 200.

According to an embodiment, the communication system 10 may be divided into a core network 50, the BTS 100 constituting an access network for connecting a user terminal to the core network 50, and the DAS 200.

The DAS 200 is described as an example of a communication network, and may directly perform at least some functions of the base station 100.

According to an embodiment, the DAS 200 may configure a single communication network with the NMS 300.

The DAS 200 may include a headend device 210 that is communicatively connected to the base station 100 and constitutes a headend node, a plurality of remote devices 220a, 220b, 220c, and 220d that constitute a remote node and are connected to other remote nodes or arranged at each remote service location and communicatively connected to a user terminal, and extension devices 230a and 230b constituting an extension node.

According to an embodiment, the DAS 200 may be implemented as an analog DAS.

According to another embodiment, the DAS 200 may be implemented as a digital DAS, and in some cases may be implemented in a hybrid type, for example, in the form of analog processing for some nodes and digital processing for other nodes.

Meanwhile, FIG. 1 shows an example of a topology of the DAS 200 and various variations are possible in the DAS 200 considering specificity of installation areas and application fields (e.g., in-building, a subway, a hospital, a stadium, etc.).

The extension devices 230a and 230b in the DAS 200 may be utilized when the number of branches of the headend device 210 is limited compared to the number of remote devices to be installed.

Each node in the DAS 200 and its function will be described in more detail. First, the headend device 210 may serve as an interface with a base station.

According to an embodiment, the headend device 210 may be connected to a plurality of base stations.

According to an embodiment, the headend device 210 may be implemented with a main headend device and a sub headend device, and may be connected to a base station for each service frequency band of a specific service provider or a base station for each sector. In some cases, the main headend device may compensate for coverage by the sub headend device.

In general, because a radio frequency (RF) signal received from a base station is a high-power signal, the headend device 210 may attenuate such a high-power RF signal into a signal of power suitable for processing at each node. The headend device 210 may lower a high-power RF signal for each frequency band or for each sector to a low-power RF signal. The headend device 210 may combine the low-power RF signals and may distribute the combined signal to the extension device 230a or the remote device 220a.

According to an embodiment, the headend device 210 may directly receive a communication signal (e.g., Common Public Radio Interface (CPRI), Open Radio Interface (ORI), and Open Baseband Remote Radiohead Interface (OBSAI), e-CPRI, etc.) in a digital format from a base station.

Each of the remote devices 220a, 220b, 220c, and 220d may separate received combined signals for each frequency band and perform signal processing such as amplification. Accordingly, each of the remote devices 220a, 220b, 220c, and 220d may transmit a base station signal to a user terminal within service coverage of the remote devices through a service antenna (not shown).

The remote device 220a and the remote device 220b may be connected to each other through an RF cable or wireless communication, and a plurality of remote devices may be connected to each other in a cascade structure if necessary.

The extension device 230a may transmit the received combined signal to the remote device 220c connected to the extension device 230a.

The extension device 230b may be connected to one end of the remote device 220a and may receive a signal received from the headend device 210 through the remote device 220a in downlink communication. The extension device 230b may transmit the received signal back to the remote device 220d connected to a rear end of the extension device 230b.

The base station 100 and the headend device 210 may be connected to each other through an RF cable, an optical cable, or an Ethernet cable (e.g., a twisted cable or a UTP cable), and may be connected to each other through an optical cable or an Ethernet cable (e.g., a twisted cable or a UTP cable), except between the remote device 220a and the remote device 220b, at a lower end of the headend device 210, and a signal transport medium between nodes or a communication method thereof may vary.

According to an embodiment, when internal components of the DAS 200 are connected to each other by an optical cable, the headend device 210, the remote devices 220a, 220b, 220c, and 220d, and the extension devices 230a and 230b may include an optical transceiver module for transmitting and receiving optical signals through electro-optical conversion/photoelectric conversion, and may further include a wavelength division multiplexing (WDM) device when nodes are connected to each other by a single optical cable.

The DAS 200 may be connected to an external management device (not shown) such as the NMS 300 or a network operation center (NOC) (not shown) via a network. Accordingly, an administrator may remotely monitor the state and problem of each node of the DAS 200, and may remotely control the operation of each node.

In FIG. 1, a synchronization source connected to a communication node is omitted for convenience of description.

Figure 2:
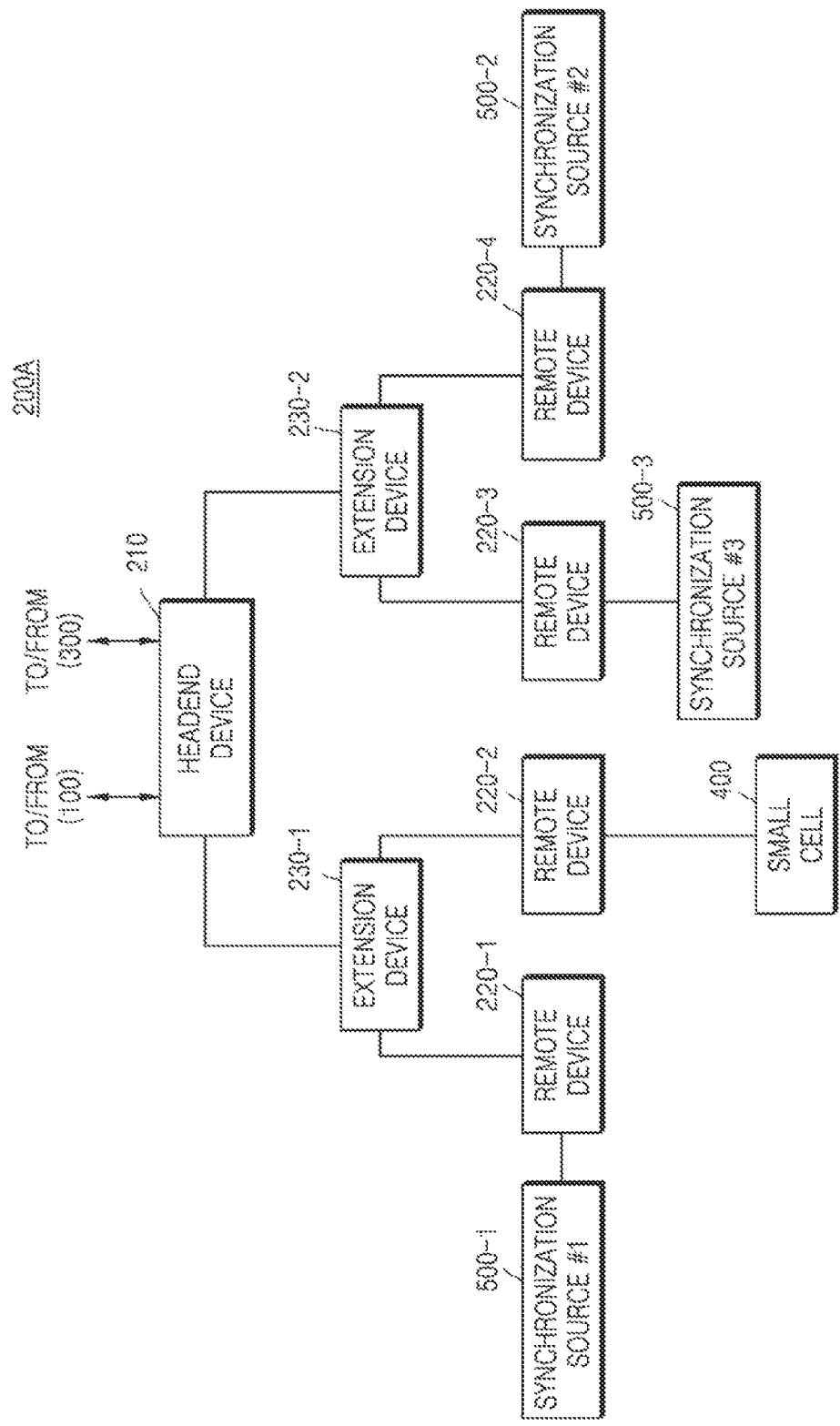
FIG. 2 is a block diagram of a distributed antenna system shown in FIG. 1 according to an embodiment.

FIG. 2 is a block diagram of a distributed antenna system shown in FIG. 1 according to an embodiment.

Referring to FIGS. 1 and 2 together, a DAS 200A may include the headend device 210, remote devices 220-1 to 220-4, extension devices 230-1 and 230-2, a small cell 400, and synchronization sources 500-1 to 500-3.

The DAS 200A as an example of a communication network may include a plurality of communication nodes (e.g., the headend device 210, the remote devices 220-1 to 220-4, and the extension devices 230-1 and 230-2).

The DAS 200A may include at least two or more communication nodes (e.g., 220-1, 220-3, and 220-4) to which the synchronization sources 500-1 to 500-3 are connected.

The NMS 300 that manages communication nodes (e.g., 210, 220-1 to 220-4, 230-1 to 230-2, and 400) of the DAS 200A or the headend device 210 of the DAS 200A may select a synchronization source to be used for synchronization of the DAS 200A from among the synchronization sources 500-1 to 500-3 connected to the communication nodes.

According to an embodiment, the NMS 300 or the headend device 210 may obtain a quality parameter of synchronization sources (e.g., 500-1 to 500-3) and a capacity parameter of communication nodes (e.g., 220-1, 220-3, and 220-4) connected to the synchronization sources (e.g., 500-1 to 500-3), and may determine a priority of the synchronization sources (e.g., 500-1 to 500-3) based on the obtained quality parameter and capacity parameter.

The quality parameter may refer to various parameters indicating accuracy and stability of a synchronization signal provided by synchronization sources.

For example, the quality parameter may be determined based on at least one of a holdover time of a synchronous source, temperature stability, an operating temperature range, a stratum level, a frequency quality, and a phase quality.

For example, the frequency quality may be a quality indicator that indicates the number of signals having a frequency error (e.g., 16 ppb) from among the reference number of signals.

For example, the phase quality may be a quality indicator (e.g., +/−5 ns) that indicates a time range in which a phase error may occur.

The capacity parameter may be determined based on the number of slave nodes that can be accommodated when a communication node to which a synchronization source is connected operates as a master node.

For example, the capacity parameter may be determined based on the maximum number of slave nodes that can be accommodated when a communication node operates as a master node.

Examples of the quality parameter and the capacity parameter will be described later with reference to FIG. 4.

According to an embodiment, the priority may be flexibly determined based on fluctuating quality parameters and capacity parameters.

The NMS 300 or the headend device 210 may select a synchronization source to be used for synchronization from among the plurality of synchronization sources 500-1 to 500-3 according to the determined priority.

The synchronization sources 500-1 to 500-3 may generate a synchronization signal.

According to an embodiment, the synchronization sources 500-1 to 500-3 may include a Global Positioning System (GPS) antenna. In this case, a synchronization source 500 may receive a GPS signal from the outside of the DAS 200A and use the received GPS signal as a synchronization signal.

According to an embodiment, the synchronization sources 500-1 to 500-3 may use a synchronization clock source such as a primary reference clock (PRC) and a primary reference source (PRS) of Stratum 1, a synchronization supply unit (SSU), stand-alone synchronization equipment (SASE), building integrated timing supply (BITS) of Stratum 2, and an SDH equipment clock (SEC) of Stratum 3.

According to an embodiment, at least one of the synchronization sources 500-1 to 500-3 may be connected to an extension device or a remote device.

Figure 3:
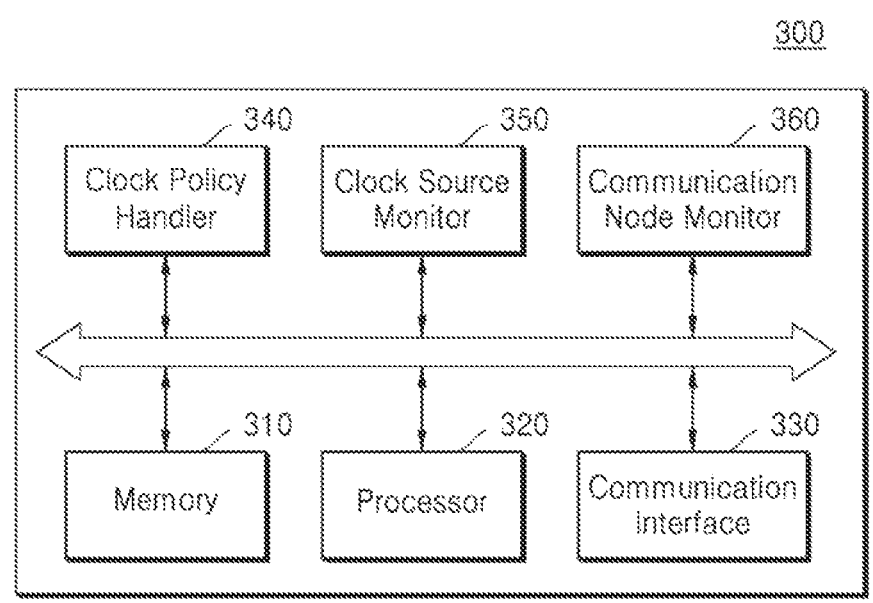
FIG. 3 is a block diagram of a network management system shown in FIG. 1, according to an embodiment.

FIG. 3 is a block diagram of a network management system shown in FIG. 1, according to an embodiment. FIG. 4 is a table showing parameters respectively corresponding to communication nodes connected to a synchronization source, according to an embodiment. FIG. 5 is a table showing characteristic information of each of communication nodes according to an embodiment.

Referring to FIGS. 1 to 3, the NMS 300 may include a memory 310, a processor 320, a communication interface 330, a clock policy handler 340, a clock source monitor 350, and a communication node monitor 360.

The memory 310 may store data necessary for the operation of the NMS 300.

According to an embodiment, the memory 310 may store data necessary for selecting a synchronization source to be used for synchronization of the DAS 200 from among a plurality of synchronization sources (e.g., 500-1 to 500-3) in a communication network managed by the NMS 300, for example, the DAS 200.

According to an embodiment, the memory 310 may store a quality parameter of synchronization sources and a capacity parameter of communication nodes connected to the synchronization sources in various forms, for example, in the form of a table.

Referring to FIG. 4 together, a quality parameter and a capacity parameter may be stored in the form of the table shown in FIG. 4 according to an embodiment.

The table for storing a quality parameter and a capacity parameter may include identification information of a communication node (e.g., DAS unit name), and information about an IP address of a communication node (e.g., DAS Unit IP Address), a priority (e.g., Priority), whether a corresponding communication node may operate as a grand master (GM) of an IEEE 1588 PTP protocol (e.g., Designated 1588 GM Role), whether a corresponding communication node may operate as a source (or root) of syncE (e.g., SyncE source role), the maximum number of slave nodes that a corresponding node may accommodate (e.g., Max 1588 Slave Capacity), a quality parameter of a synchronization source (e.g., Oscillator Quality), the number of slave nodes connected to a communication node currently operating as a grand master (e.g., Current 1588 Slave Counts), an activation state (e.g., Unit State) of a communication node, and a synchronization mode (e.g., Current 1588 Mode) in which a communication node is currently operating.

According to an embodiment, the quality parameter may include a quality parameter of a synchronization source (e.g., Oscillator Quality) in the table of FIG. 4.

According to an embodiment, in the table of FIG. 4, the capacity parameter may include information about whether a corresponding communication node may operate as the grand master (GM) of the IEEE 1588 PTP protocol (e.g., Designated 1588 GM Role), whether a corresponding communication node may operate as a syncE root (e.g., SyncE source role), the maximum number of slave nodes that a corresponding node may accommodate (e.g., Max 1588 Slave Capacity), the number of slave nodes connected to a communication node currently operating as a grand master (e.g., Current 1588 Slave Counts), an activation state (e.g., Unit State) of a communication node, and a synchronization mode (e.g., Current 1588 Mode) in which a communication node is currently operating.

According to an embodiment, in the table of FIG. 4, the priority may be a value calculated by the processor 320 using a quality parameter and a capacity parameter.

According to an embodiment, the priority may be determined by applying a weight to each of the quality parameter and the capacity parameter.

The processor 320 may control all operations of the NMS 300, and the NMS 300 may perform determination and processing.

According to an embodiment, the processor 320 may determine the priority by using the quality parameter and the capacity parameter stored in the memory 310.

The processor 320 may select a synchronization source to be used for synchronization of the DAS 200 from among a plurality of synchronization sources (e.g., 500-1 to 500-3) in a communication network managed by the NMS 300, for example, the DAS 200 based on the determined priority.

The communication interface 330 may interface communication between the NMS 300 and the DAS 200.

The clock policy handler 340 may generate and output a setting signal for setting communication nodes in a communication network, for example, the DAS 200.

According to an embodiment, the setting signal may include information about a protocol to be used for synchronization in communication nodes (e.g., IEEE 1588 PTP, syncE, etc.), and information about a synchronization mode to be used in communication nodes (e.g., a transparent clock mode, a boundary clock mode, master and slave settings in the boundary clock mode, etc.).

According to an embodiment, the clock policy handler 340 may transmit a setting signal for setting communication nodes in a communication network, for example, the DAS 200, to the DAS 200 through the communication interface 330 according to a result of the synchronization source selection of the processor 320.

According to an embodiment, the clock policy handler 340, according to the result of the synchronization source selection of the processor 320, may set a relatively close communication node as a master node and a relatively distant communication node as a slave node based on a communication node connected to the selected synchronization source.

According to an embodiment, the setting signal may include a control signal for setting SyncE information and IEEE 1588 PTP information of communication nodes.

According to an embodiment, the clock policy handler 340 may be implemented in the form of some functions of the processor 320. In this case, the clock policy handler 340 may be included in the processor 320.

According to an embodiment, the clock policy handler 340, by using a monitoring result of the clock source monitor 350 and the communication node monitor 360, may set communication nodes to use another synchronization source when a new synchronization source is connected or when a failure occurs in a synchronization source in use or a communication node connected to the synchronization source.

The clock source monitor 350 may monitor the state of synchronization sources (e.g., a quality state, an operation state, a failure state, an additional connection or disconnection state of synchronization sources, etc.) in a communication network, for example, the DAS 200.

According to an embodiment, the clock source monitor 350 may reflect and store a result of the monitoring in the table stored in the memory 310.

The communication node monitor 360 may monitor the state of communication nodes (e.g., a quality state, an operation state, a failure state, an additional connection or disconnection state of communication nodes, etc.) in a communication network, for example, the DAS 200.

According to an embodiment, the communication node monitor 360 may reflect and store a result of the monitoring in the table stored in the memory 310.

Referring to FIG. 5 together, a result of the monitoring by the communication node monitor 360 may be stored or updated in the form of the table shown in FIG. 5.

The table shown in FIG. 5 may include characteristic information of a communication node. The table for including characteristic information of a communication node may include identification information of a communication node (e.g., DAS unit Name), an IP address of a communication node (e.g., a DAS Unit IP Address), whether to support IEEE 1588 PTP (e.g., 1588 support), whether to support syncE (e.g., syncE support), whether to support a boundary clock mode of an IEEE 1588 PTP protocol (e.g., 1588 BC capability), whether to support a connection tracking function of an IEEE 1588 PTP protocol (e.g., 1588 connection tracking enable), the maximum number of slave nodes that can be accommodated in a corresponding communication node (e.g., max 1588 slave capacity), a synchronization mode of an IEEE 1588 PTP protocol currently used in a corresponding communication node (e.g., a current 1588 mode), the number of slave nodes tracked through a connection tracking function (e.g., current 1588 connection tracking counts), the number of slave nodes currently connected to a corresponding communication node (e.g., current 1588 slave counts), an active state of a corresponding communication node (e.g., a unit state), and a state of a slave-master interface (e.g., a sync slave interface or a sync master interface).

Although FIG. 3 shows the configuration of the NMS 300, when the headend device 210 of the DAS 200 performs a synchronization method of a communication network according to an embodiment of the present invention, the headend device 210 may perform the same function as in FIG. 3 including the components 310 to 360 of FIG. 3.

Figure 6:
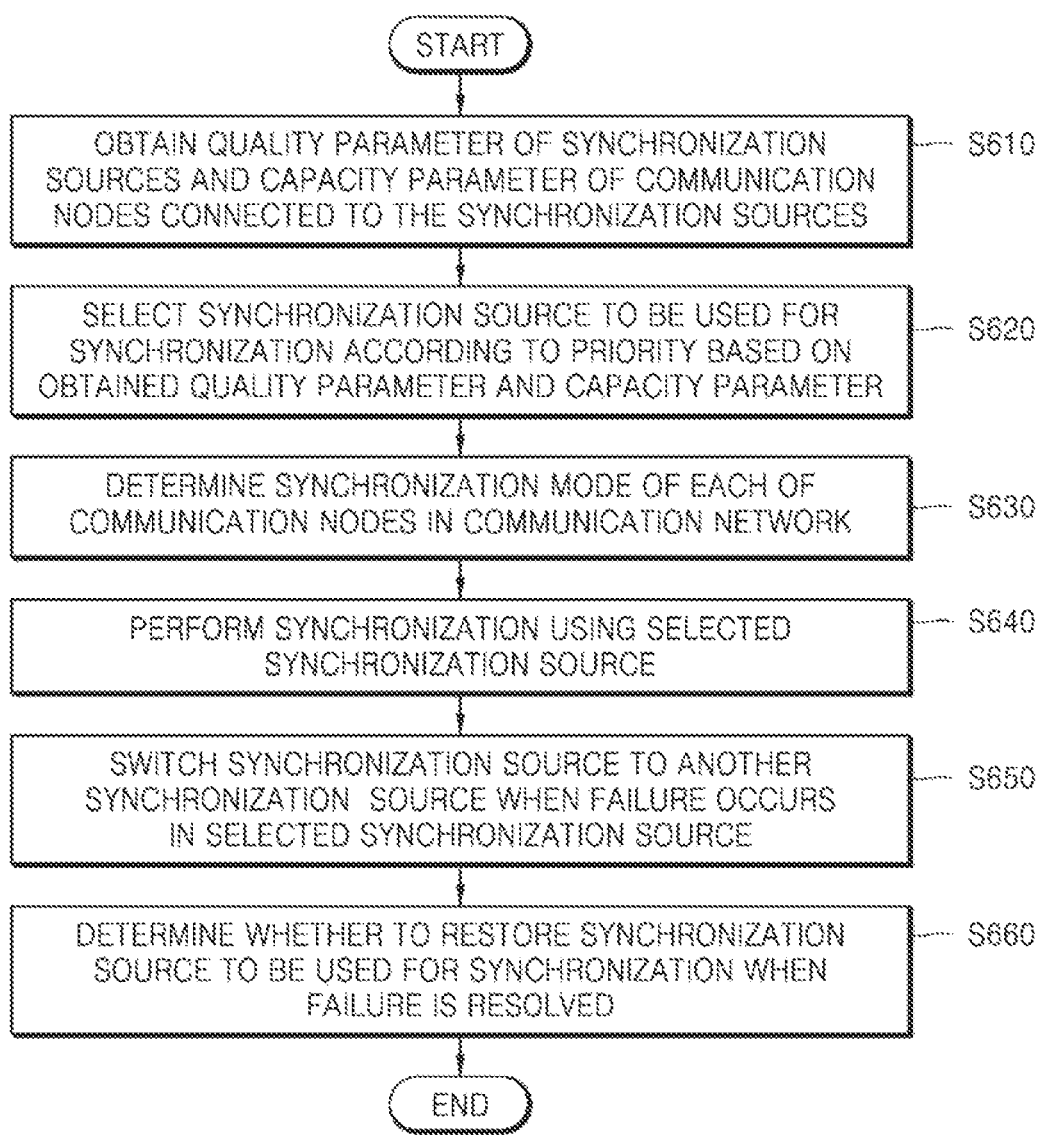
FIG. 6 is a flowchart illustrating a synchronization method of a communication network according to an embodiment.
Figure 7:
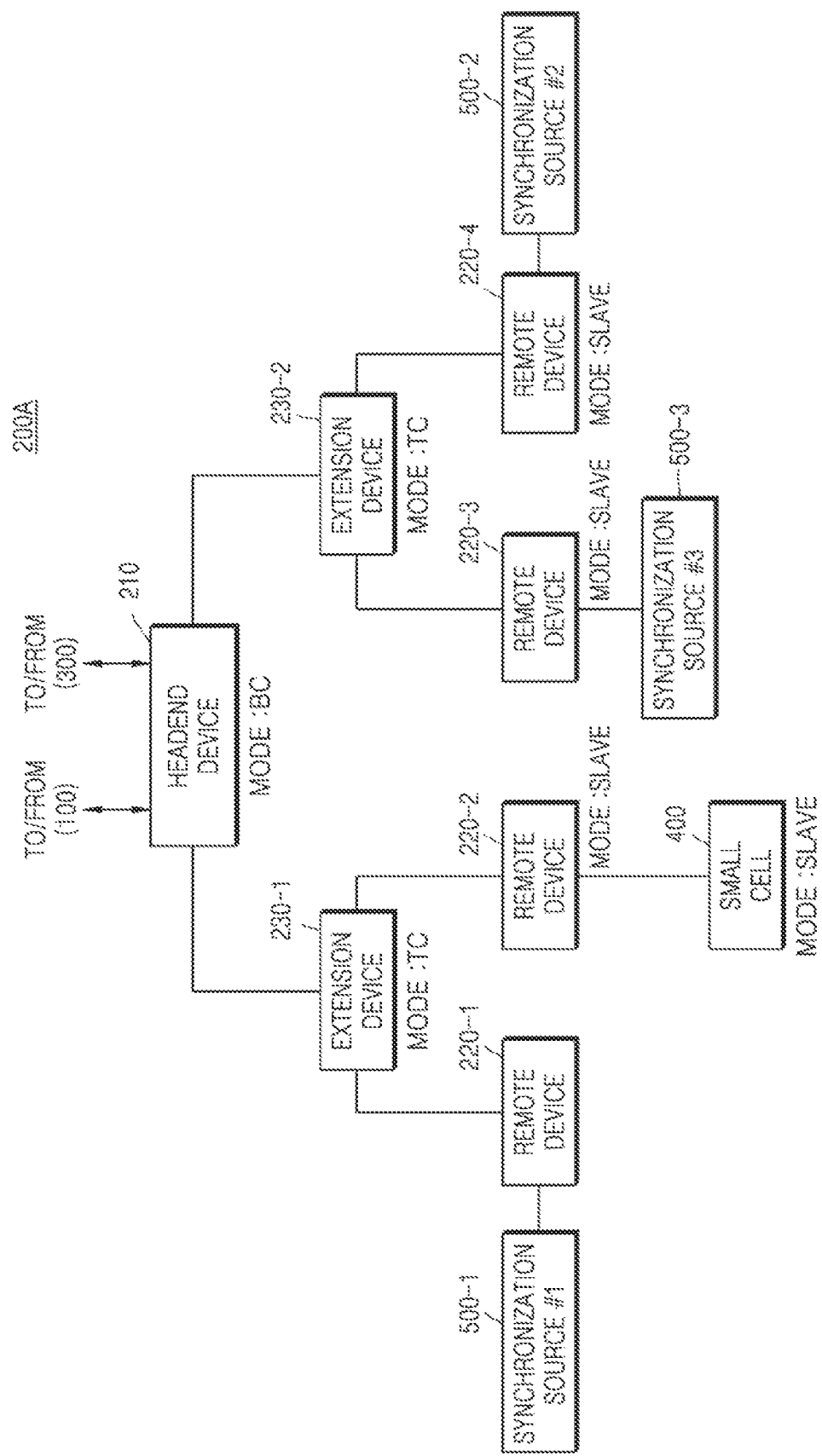
FIG. 7 is a view illustrating an example in which a synchronization mode of communication nodes is set according to the synchronization method of the communication network of FIG. 6.

FIG. 6 is a flowchart illustrating a synchronization method of a communication network according to an embodiment. FIG. 7 is a view illustrating an example in which a synchronization mode of communication nodes is set according to the synchronization method of the communication network of FIG. 6.

Referring to FIG. 6, in operation S610, the NMS 300 or the headend device 210 may obtain a quality parameter of at least two or more synchronization sources connected to communication nodes in a communication network (e.g., the DAS 200) and a capacity parameter of a communication node connected to the synchronization sources.

In operation S620, the NMS 300 or the headend device 210 may determine a priority based on the obtained quality parameter and capacity parameter, and may select a synchronization source to be used for synchronization of a communication network (e.g., the DAS 200) according to the priority.

In operation S630, the NMS 300 or the headend device 210 may determine a synchronization mode of each of the communication nodes based on the synchronization source selected in operation S620.

According to an embodiment, the synchronization mode may be divided into a transparent clock mode, a boundary clock mode, and a master and a slave in the boundary clock mode.

Referring to FIG. 7 together, in operation S620, one synchronization source 500-1 may be selected from among the plurality of synchronization sources 500-1 to 500-3 as a synchronization source to be used for synchronization of a communication network (e.g., the DAS 200).

In this case, the communication node 220-1 connected to the selected synchronization source 500-1 becomes a Grand Master (GM), and a synchronization mode of the remaining communication nodes may be determined based on the communication node 220-1.

According to an embodiment, the synchronization mode of the remaining communication nodes may be determined based on information about a communication node (e.g., 220-1) connected to a selected synchronization source and characteristic information (whether a boundary clock mode is supported or not, the number of slave nodes that can be accommodated when the boundary clock mode is supported, etc.) of the remaining communication nodes 210, 220-2 to 220-4, 230-1, 230-2, and 400 together.

According to an embodiment, when the headend device 210 supports the boundary clock mode, the synchronization mode may be determined in the form shown in FIG. 7.

According to an embodiment, based on a communication node (e.g., 220-1) connected to a selected synchronization source (e.g., 500-1), an uppermost communication node (e.g., 210) may be set to the boundary clock mode.

According to an embodiment, based on a selected synchronization source (e.g., 500-1), the remaining communication nodes 230-1 and 230-2 except for an uppermost communication node (e.g., 210) and terminal communication nodes 220-2 to 220-4 and 400 may be set to the transparent clock mode.

Returning to FIG. 6, in operation S640, a communication network, for example, the DAS 200 may perform synchronization using a synchronization signal provided from a selected synchronization source.

In operation S650, when a failure occurs in the selected synchronization source, the NMS 300 or the headend device 210 may switch a synchronization source (e.g., 500-1) to be used for synchronization of a communication network, for example, the DAS 200 to another synchronization source (e.g., 500-2).

According to an embodiment, when switching the synchronization source to another synchronization source in operation S650, any one synchronization source may be selected from among other synchronization sources (e.g., 500-2 and 500-3) according to a priority recalculated based on the quality parameter and the capacity parameter.

In operation S660, the NMS 300 or the headend device 210 may monitor a failure state of a synchronization source having a failure or a communication node connected to the synchronization source, and may determine whether to restore the synchronization source to use an synchronization source which the failure is resolved (i.e., a synchronization source that was selected before the failure) when the failure is resolved.

According to an embodiment, when the failure of the synchronization source having a failure is resolved in operation S660 and when a difference between the quality of the synchronization source from which the failure is resolved (i.e., the synchronization source that was selected before the failure) and the quality of a currently used synchronization source exceeds a reference value, the NMS 300 or the headend device 210 may restore the synchronization source to use the synchronization source which the failure is resolved.

Hereinabove, the present invention has been described with reference to the preferred embodiments. However, it will be appreciated by one of ordinary skill in the art that various modifications and changes of the present invention can be made without departing from the scope of the inventive concept which are defined in the appended claims and their equivalents.

The invention claimed is:

1. A method of synchronizing a communication network, the method comprising:
    obtaining, by a network management system, a quality parameter of at least two or more synchronization sources connected to communication nodes in the communication network and a capacity parameter of the communication nodes connected to the synchronization sources;
    selecting, by the network management system, a synchronization source to be used for synchronization of the communication network from among the at least two or more synchronization sources, according to a priority calculated based on the obtained quality parameter and capacity parameter; and
    transmitting, by the network management system, a setting signal for setting the communication nodes in the communication network for synchronization of the communication network using a synchronization signal provided from the selected synchronization source.

2. The method of claim 1, wherein the quality parameter and the capacity parameter are stored in a form of a table in the network management system that manages the communication network.

3. The method of claim 1, wherein the priority is flexibly determined based on the quality parameter and the capacity parameter.

4. The method of claim 1, wherein the quality parameter is determined based on at least one of a holdover time of the synchronization source, temperature stability, an operating temperature range, a stratum level, a frequency quality, and a phase quality.

5. The method of claim 1, wherein the capacity parameter is determined based on a number of slave nodes that can be accommodated when a communication node to which the synchronization source is connected operates as a master node.

6. The method of claim 5, further comprising:
    receiving the capacity parameter from each of the communication nodes in the communication network.

7. The method of claim 1, wherein the priority is determined by reflecting a weight in each of the quality parameter and the capacity parameter.

8. The method of claim 1, further comprising:
    after selecting the synchronization source to be used for synchronization of the communication network, determining a synchronization mode of each of the communication nodes based on a selected synchronization source and characteristic information of each of the communication nodes in the communication network.

9. The method of claim 8, wherein the characteristic information of each of the communication nodes comprises:
    at least one of whether each of the communication nodes supports a specific synchronization mode, whether a communication node connected to a corresponding communication node may be tracked, a capacity of a slave node, a number of the communication nodes currently connected to a corresponding communication node, and a number of slave nodes corresponding to a communication node.

10. The method of claim 9, wherein the number of the communication nodes currently connected to the corresponding communication node is obtained using a connection tracking function of an IEEE 1588 Precision Time Protocol (PTP) protocol.

11. The method of claim 8, wherein the synchronization mode is a transparent clock mode or a boundary clock mode of an IEEE 1588 Precision Time Protocol (PTP) protocol.

12. The method of claim 1, wherein the communication network comprises at least one of a headend device, an extension device, and a remote device, and
    at least one of the synchronization sources is connected to the extension device or the remote device.

13. The method of claim 1, further comprising:
    monitoring whether the selected synchronization source has a failure; and
    selecting another synchronization source to be used for synchronization of the communication network according to a priority recalculated based on the quality parameter and the capacity parameter when the selected synchronization source has a failure.

14. The method of claim 13, further comprising:
    when the failure of the selected synchronization source is resolved, determining whether to use the selected synchronization source that was selected before the failure to synchronize the communication network.

15. A network management system comprising:
    a memory configured to obtain and store a quality parameter of at least two or more synchronization sources connected to communication nodes in a communication network and a capacity parameter of the communication nodes connected to the synchronization sources;
    a processor configured to select a synchronization source to be used for synchronization of the communication network from among the at least two or more synchronization sources, according to a priority calculated based on the quality parameter and the capacity parameter; and
    a communication interface configured to transmit a setting signal for setting the communication nodes in the communication network for synchronization of the communication network to the communication network by using a synchronization signal provided from the selected synchronization source.

* * * * *